United States Patent
O'Young et al.

(10) Patent No.: US 11,582,538 B2
(45) Date of Patent: Feb. 14, 2023

(54) HORIZONTAL CABLE MANAGER WITH A HINGED DOOR

(71) Applicant: Panduit Corp., Tinley Park, IL (US)

(72) Inventors: Jason O'Young, Tinley Park, IL (US); Kevin M. Zumbek, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 200 days.

(21) Appl. No.: 16/937,920

(22) Filed: Jul. 24, 2020

(65) Prior Publication Data
US 2021/0044876 A1  Feb. 11, 2021

Related U.S. Application Data

(60) Provisional application No. 62/882,736, filed on Aug. 5, 2019.

(51) Int. Cl.
*H04Q 1/06* (2006.01)
*H02G 3/04* (2006.01)

(52) U.S. Cl.
CPC .............. *H04Q 1/064* (2013.01); *H02G 3/045* (2013.01); *H04Q 1/066* (2013.01); *H04Q 2201/02* (2013.01); *H04Q 2201/10* (2013.01); *H04Q 2201/18* (2013.01)

(58) Field of Classification Search
None
See application file for complete search history.

(56) References Cited

U.S. PATENT DOCUMENTS

| | | | | |
|---|---|---|---|---|
| 4,645,292 A | * | 2/1987 | Sammueller | G02B 6/3839 385/59 |
| 5,210,906 A | * | 5/1993 | Aihara | E05D 1/06 16/272 |
| 5,442,726 A | * | 8/1995 | Howard | H04Q 1/10 385/136 |
| 5,971,508 A | * | 10/1999 | Deimen | A47B 97/00 108/50.02 |
| 5,971,509 A | * | 10/1999 | Deimen | H02G 3/0437 108/26 |
| 6,766,093 B2 | | 7/2004 | McGrath et al. | |
| 6,884,942 B2 | | 4/2005 | McGrath et al. | |
| 7,000,784 B2 | | 2/2006 | Canty et al. | |

(Continued)

FOREIGN PATENT DOCUMENTS

| | | | | |
|---|---|---|---|---|
| EP | 2805195 A1 | 11/2014 | | |
| EP | 3334176 A1 | * 6/2018 | | H01R 9/2416 |

(Continued)

*Primary Examiner* — Timothy J. Dole
*Assistant Examiner* — Muhammed Azam
(74) *Attorney, Agent, or Firm* — Christopher S. Clancy; James H. Williams; Aimee E. McVady

(57) ABSTRACT

A horizontal cable manager that includes a body with a back and a plurality of fingers extending from the back of the body. The distal end of at least one finger includes a hinge pin holder. The horizontal cable manager also includes a door hingedly attached to the fingers extending from the body. The door has a front, a back, a top edge, a bottom edge, and at least one hinge pin receptacle positioned along the top edge or the bottom edge of the door. The hinge pin receptacle houses a magnet to enable the door to attach to the hinge pin holder of the at least one finger to hold the door in a closed position.

19 Claims, 17 Drawing Sheets

(56) References Cited

U.S. PATENT DOCUMENTS

| | | |
|---|---|---|
| 7,119,280 B1 * | 10/2006 | Ray .................. H02G 3/18 174/72 A |
| 7,121,412 B2 | 10/2006 | Richards et al. |
| 7,178,679 B2 | 2/2007 | Canty et al. |
| 7,378,046 B2 | 5/2008 | Canty et al. |
| 7,939,763 B2 | 5/2011 | Jones et al. |
| 8,014,171 B2 | 9/2011 | Kelly et al. |
| 8,242,364 B1 | 8/2012 | Shotey et al. |
| 8,457,464 B2 | 6/2013 | O'Connor |
| 8,576,580 B2 | 11/2013 | Kelly et al. |
| 8,710,369 B2 | 4/2014 | Krietzman et al. |
| 9,270,097 B2 | 2/2016 | Krietzman et al. |
| 9,372,318 B2 | 6/2016 | Veatch et al. |
| 9,784,936 B2 | 10/2017 | Grandidge et al. |
| 9,814,150 B2 | 11/2017 | Krietzman et al. |
| 10,076,054 B2 * | 9/2018 | Goergen .............. G02B 6/4471 |
| 10,694,265 B2 * | 6/2020 | Sticker ................. H01R 9/2416 |
| 2004/0060584 A1 * | 4/2004 | Diggle ................. H04Q 1/025 135/16 |
| 2004/0206532 A1 | 10/2004 | McGrath et al. |
| 2005/0006324 A1 * | 1/2005 | Richards .............. H05K 7/186 211/183 |
| 2005/0111810 A1 * | 5/2005 | Giraud ................ G02B 6/4455 385/135 |
| 2009/0090533 A1 * | 4/2009 | Jones ................... H02G 3/30 174/95 |
| 2009/0263096 A1 * | 10/2009 | Solheid ................ G02B 6/483 385/135 |
| 2010/0109493 A1 * | 5/2010 | Fargeau ............... H04B 1/082 312/7.1 |
| 2010/0301720 A1 | 12/2010 | Anderson et al. |
| 2011/0174534 A1 * | 7/2011 | Krietzman ........... H04Q 1/064 174/520 |
| 2013/0077927 A1 * | 3/2013 | O'Connor ............ G02B 6/4452 385/135 |
| 2018/0167700 A1 * | 6/2018 | Sticker ................. H04Q 1/064 |
| 2018/0299064 A1 * | 10/2018 | Hall ...................... H02G 3/045 |
| 2021/0044876 A1 | 2/2021 | O'Young et al. |
| 2021/0176888 A1 * | 6/2021 | O'Young .............. H02G 3/0456 |

FOREIGN PATENT DOCUMENTS

| | | |
|---|---|---|
| KR | 100848822 B1 * | 7/2008 |
| KR | 100968077 B1 * | 7/2010 |

\* cited by examiner

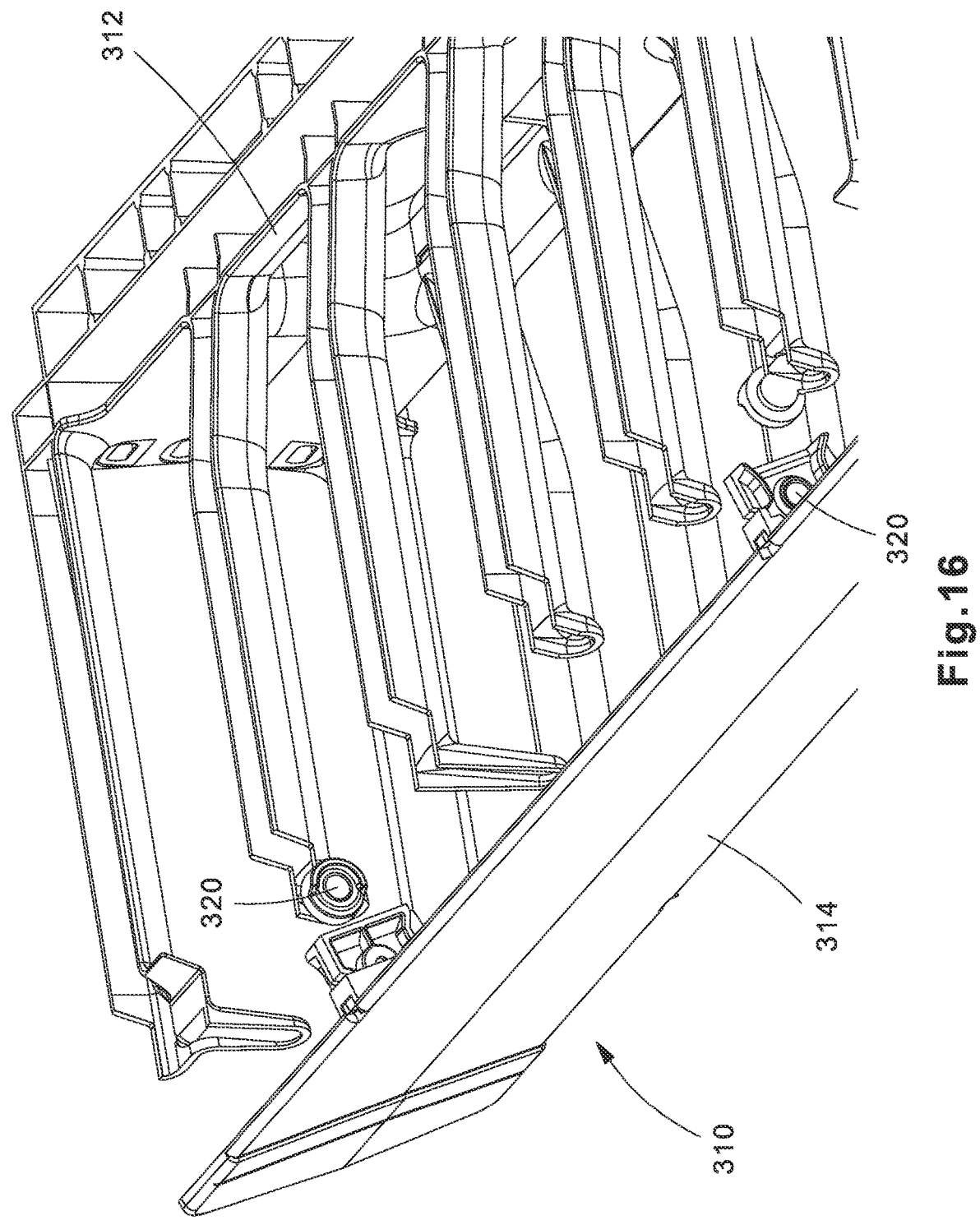

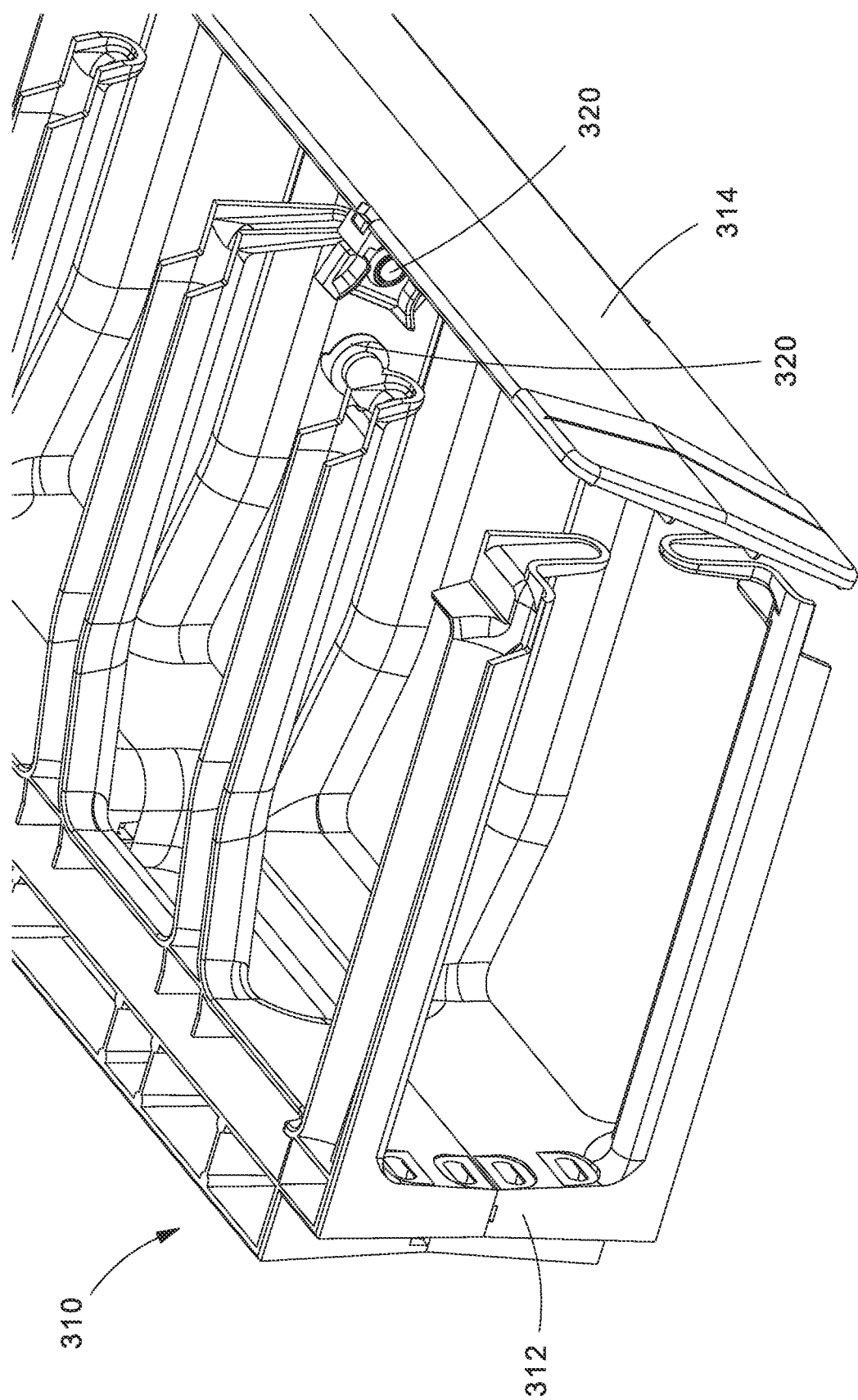

HORIZONTAL CABLE MANAGER WITH A HINGED DOOR

CROSS REFERENCE TO RELATED APPLICATIONS

This application claims benefit to U.S. Provisional Patent Application No. 62/882,736, filed on Aug. 5, 2019, the entirety of which is hereby incorporated by reference herein.

FIELD OF THE INVENTION

The present invention relates to a horizontal cable manager, and more particularly to a horizontal cable manager with a magnetic hinged door.

BACKGROUND OF THE INVENTION

FIG. 1 illustrates prior art horizontal cable managers 80 mounted to a rack 50 positioned adjacent to a vertical cable manager 100. The horizontal cable managers 80 are visually mismatched because the vertical cable manager 100 includes finger projections that have an increased length. As a result, the front face of the horizontal cable managers 80 is set back from the front face of the vertical cable managers 100.

FIG. 2 illustrates a side view of the prior art horizontal cable manager 80. The top and bottom of the horizontal cable manager include molded-in hinge receptacles. The hinge receptacle receives an extruded plastic door or a metallic door with plastic snap-in hinge elements. The opening and closing of this hinge door require a considerable amount of force.

As a result, it would be desirable to provide a horizontal cable manager with improved aesthetics including longer finger projections to match the vertical cable manager. It is also desirable to provide a horizontal cable manager with an improved hinge door that requires less force to open and close.

SUMMARY OF THE INVENTION

A horizontal cable manager routes cables in and around a network rack. The horizontal cable manager includes a body with a back and a plurality of fingers extending from the back of the body. The plurality of fingers are arranged in an upper row extending from an upper portion of the back and a lower row extending from a lower portion of the back. The upper row of fingers and the lower row of fingers are parallel to each other to create a pathway for routing the cables therein. The distal end of at least one finger has a hinge pin holder or a cable management flag. The horizontal cable manager also includes a door hingedly attached to the fingers extending from the body. The door has a front, a back, a top edge, a bottom edge, and at least one hinge pin receptacle positioned along the top edge or the bottom edge of the door. The hinge pin receptacle houses a magnet for enabling the door to attach to the hinge pin holder of the at least one finger to hold the door in a closed position.

BRIEF DESCRIPTION OF THE DRAWINGS

FIG. 16 is a top right perspective view of an alternative horizontal cable manager of the present invention.

FIG. 17 is a top left perspective view of the alternative horizontal cable manager of FIG. 16.

DETAILED DESCRIPTION

Figure 1:
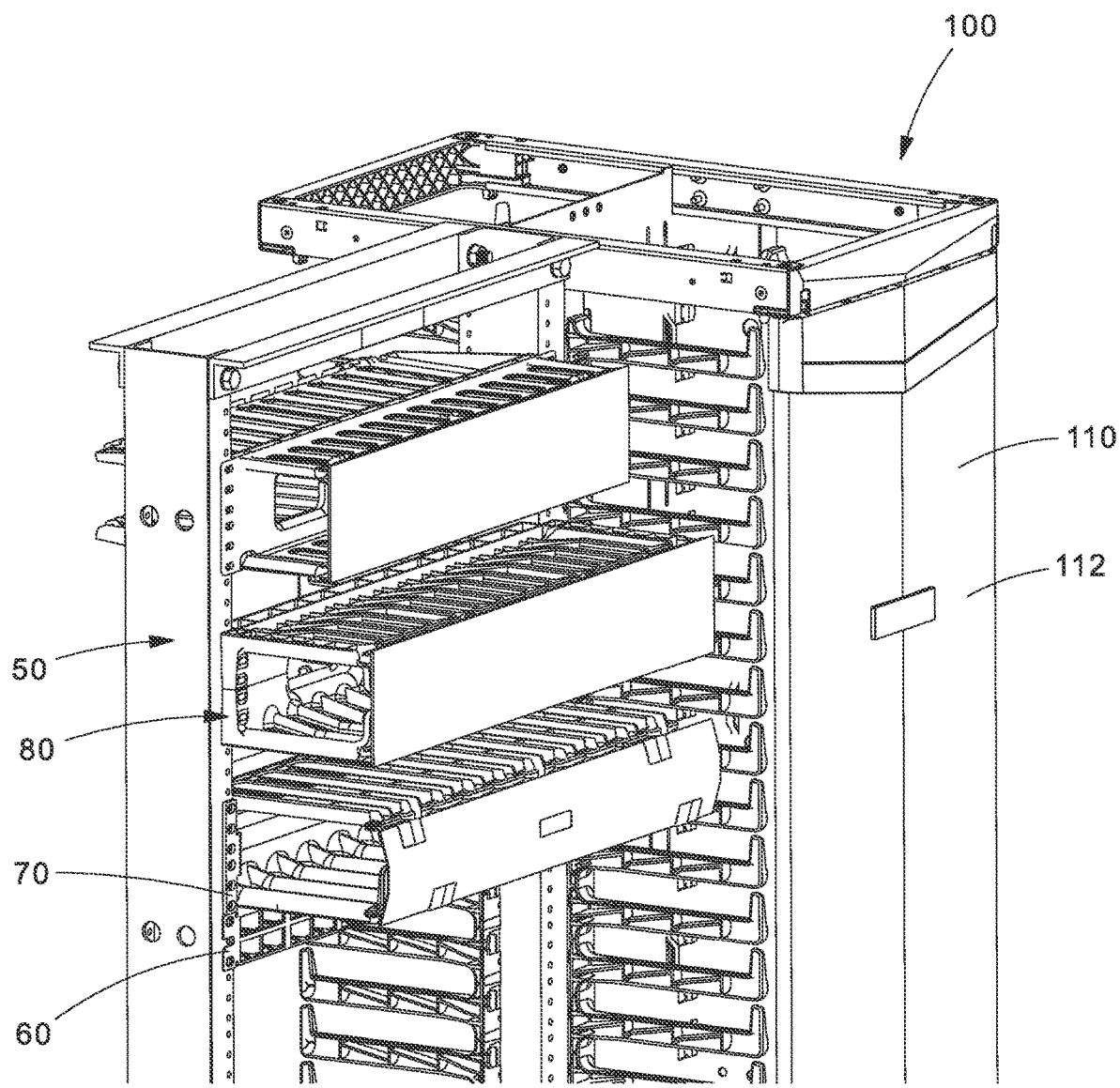
FIG. 1 is a perspective view of prior art horizontal cable managers mounted to a rack positioned adjacent to a vertical cable manager.
Figure 2:
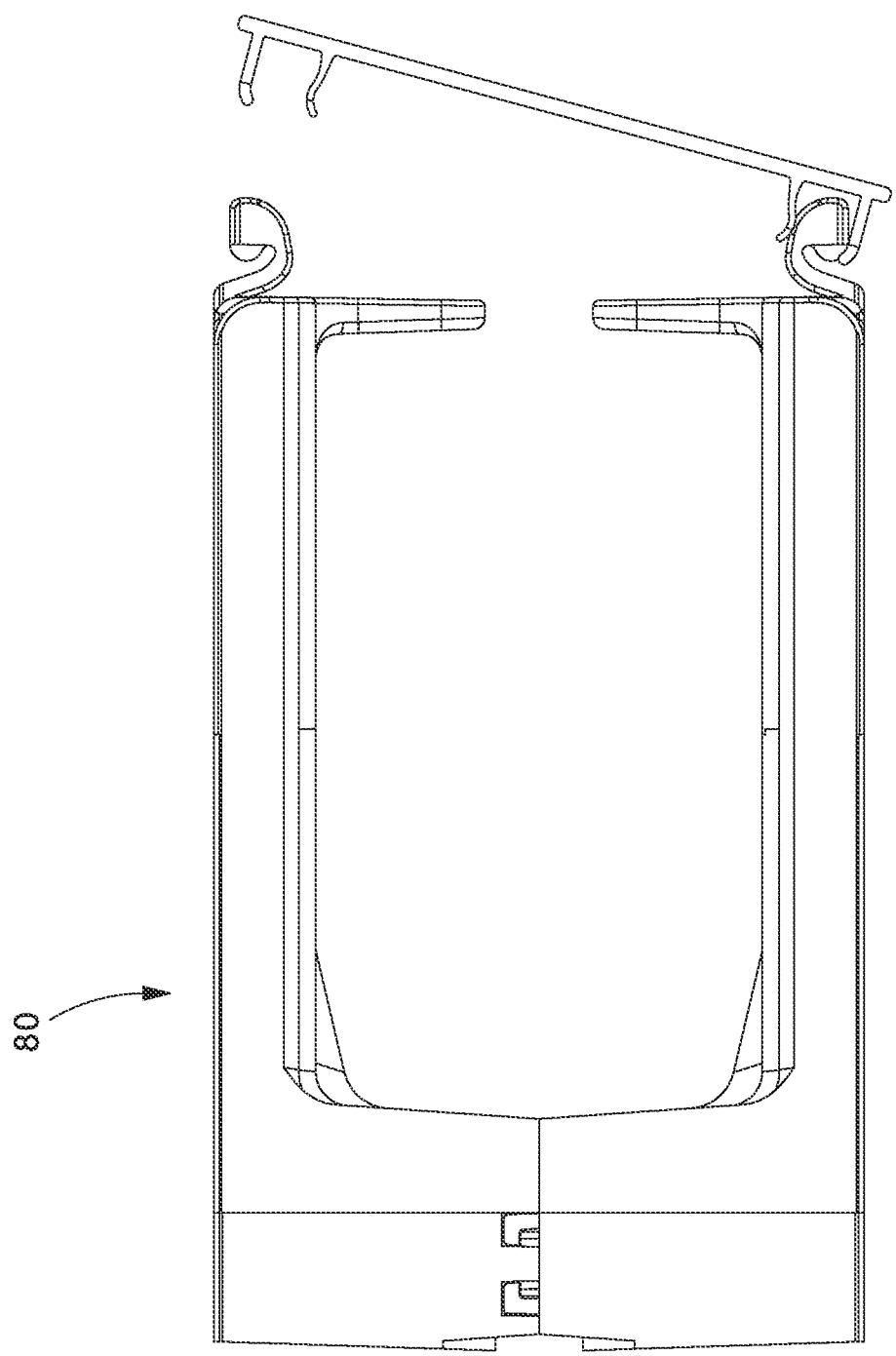
FIG. 2 is a left side view of the horizontal cable manager of FIG. 1.
Figure 3:
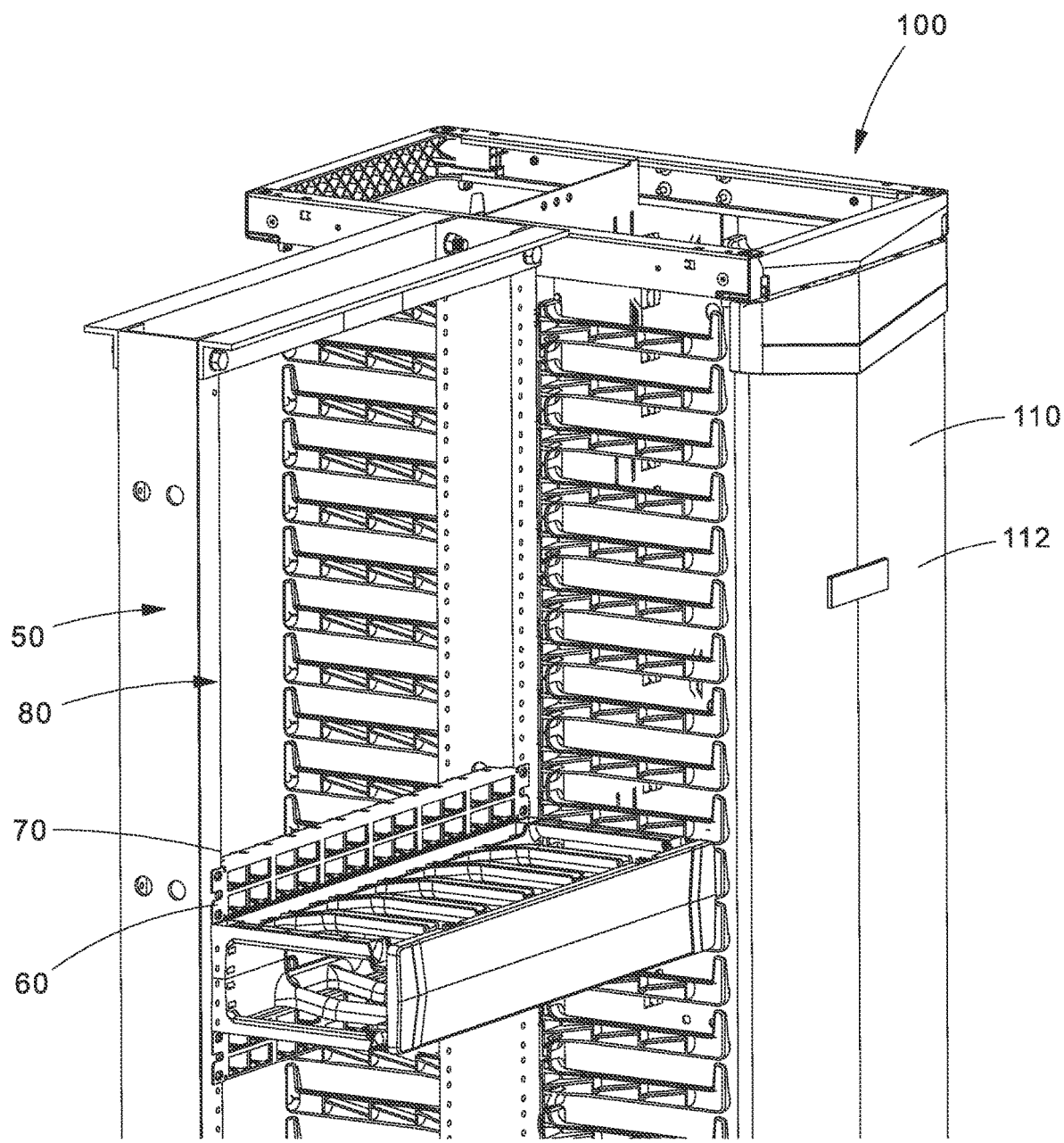
FIG. 3 is a perspective view of the horizontal cable manager of the present invention mounted to a rack positioned adjacent to a vertical cable manager.
Figure 4:
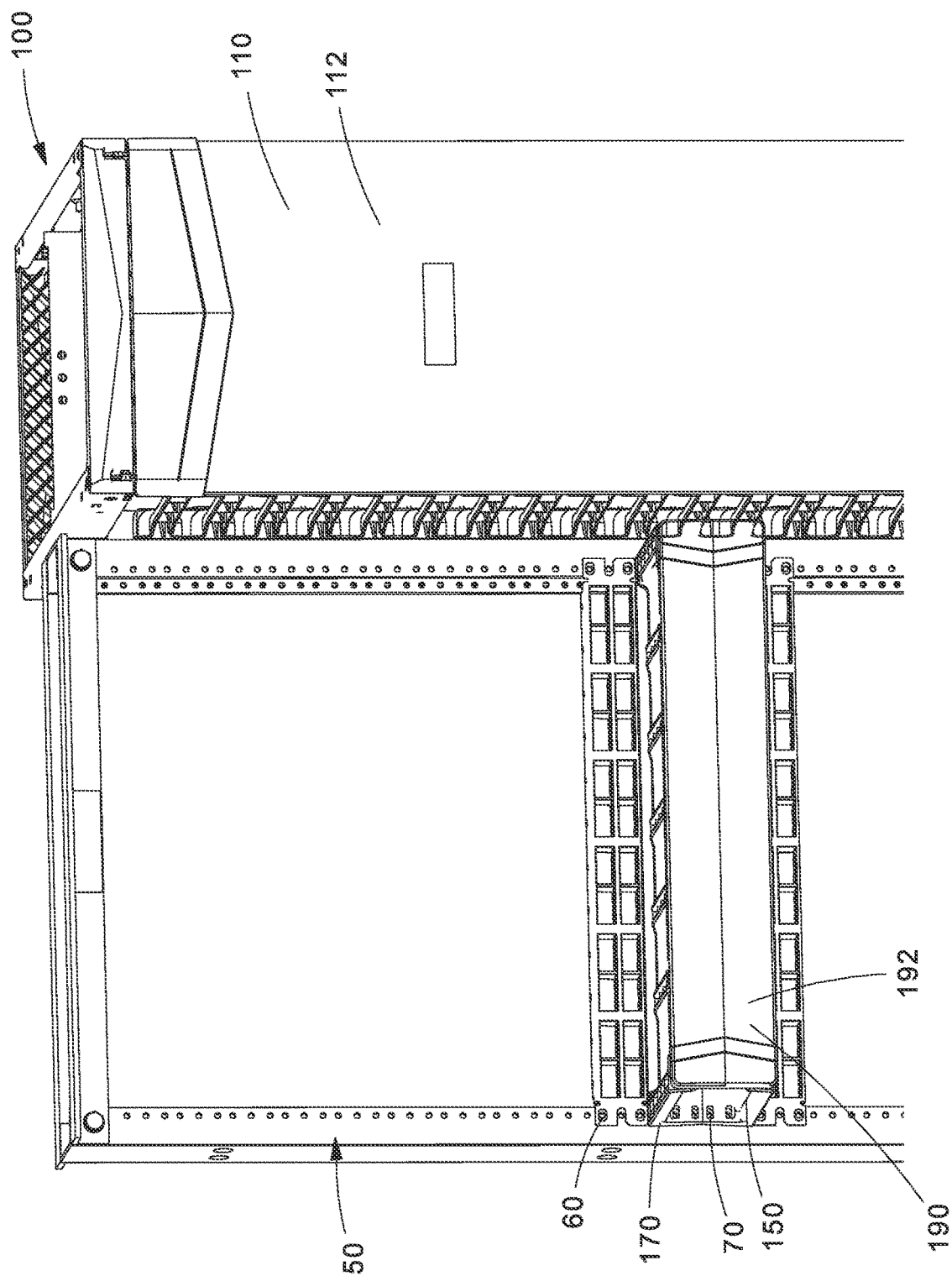
FIG. 4 is a front perspective view of the horizontal cable manager of FIG. 3 mounted to a rack positioned adjacent to a vertical cable manager.
Figure 5:
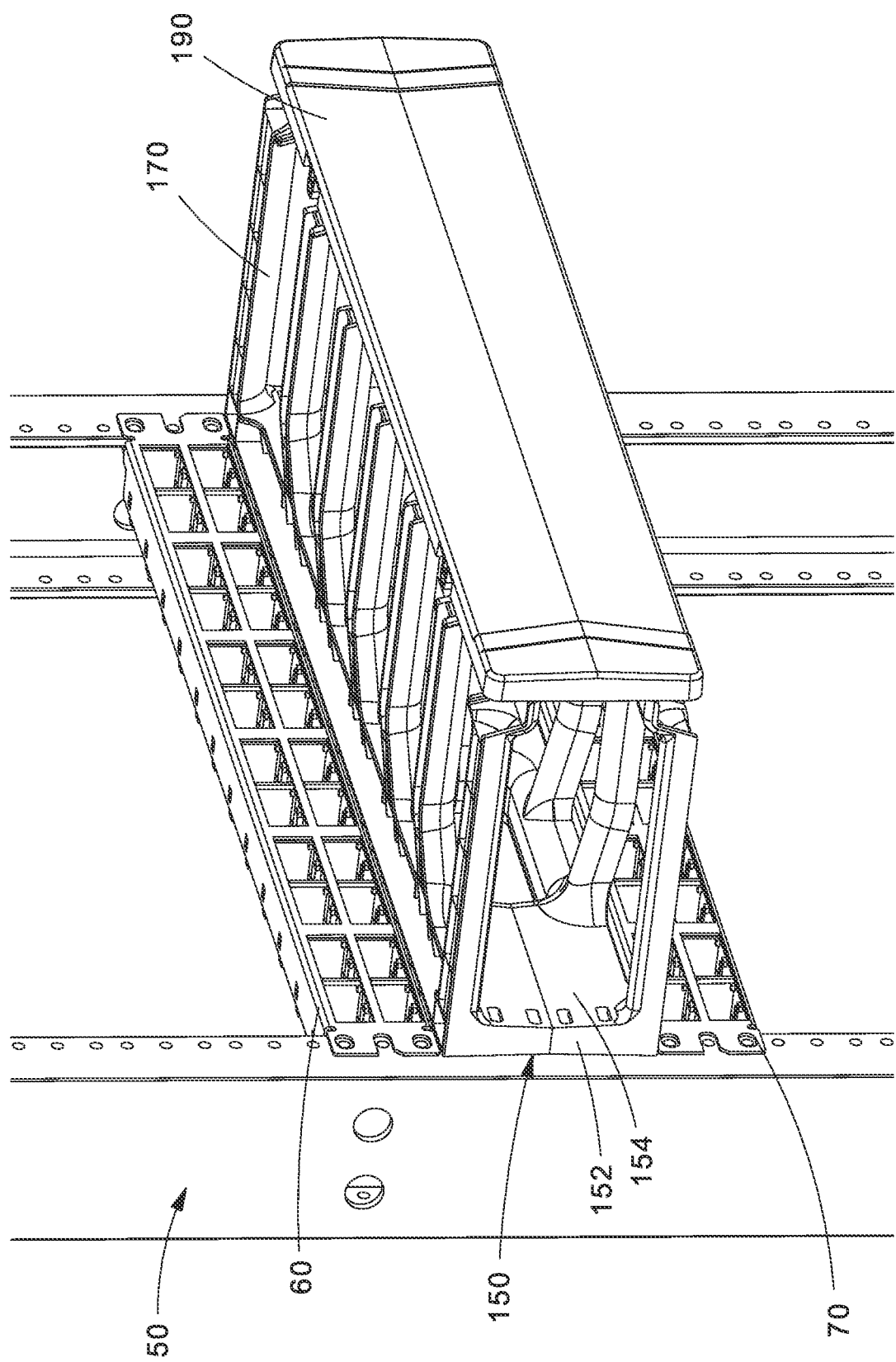
FIG. 5 is a front perspective view of the horizontal cable manager of FIG. 3 mounted to the rack.

FIGS. 3-5 illustrate the horizontal cable manager 150 of the present invention mounted to a standard 19" wide network rack 50. As described below, the horizontal cable manager 150 includes longer finger projections. The length of the fingers places the front surface 192 of the door 190 near the front of an adjoining vertical cable manager 100. For example, as illustrated in FIGS. 3 and 4, the front surface 192 of the door 190 of the present invention is near the front surface 112 of the door 110 of the vertical cable manager 100. As a result, the overall aesthetics of the horizontal cable manager 150 mounted adjacent to the vertical cable manager 100 have improved.

Figure 6:
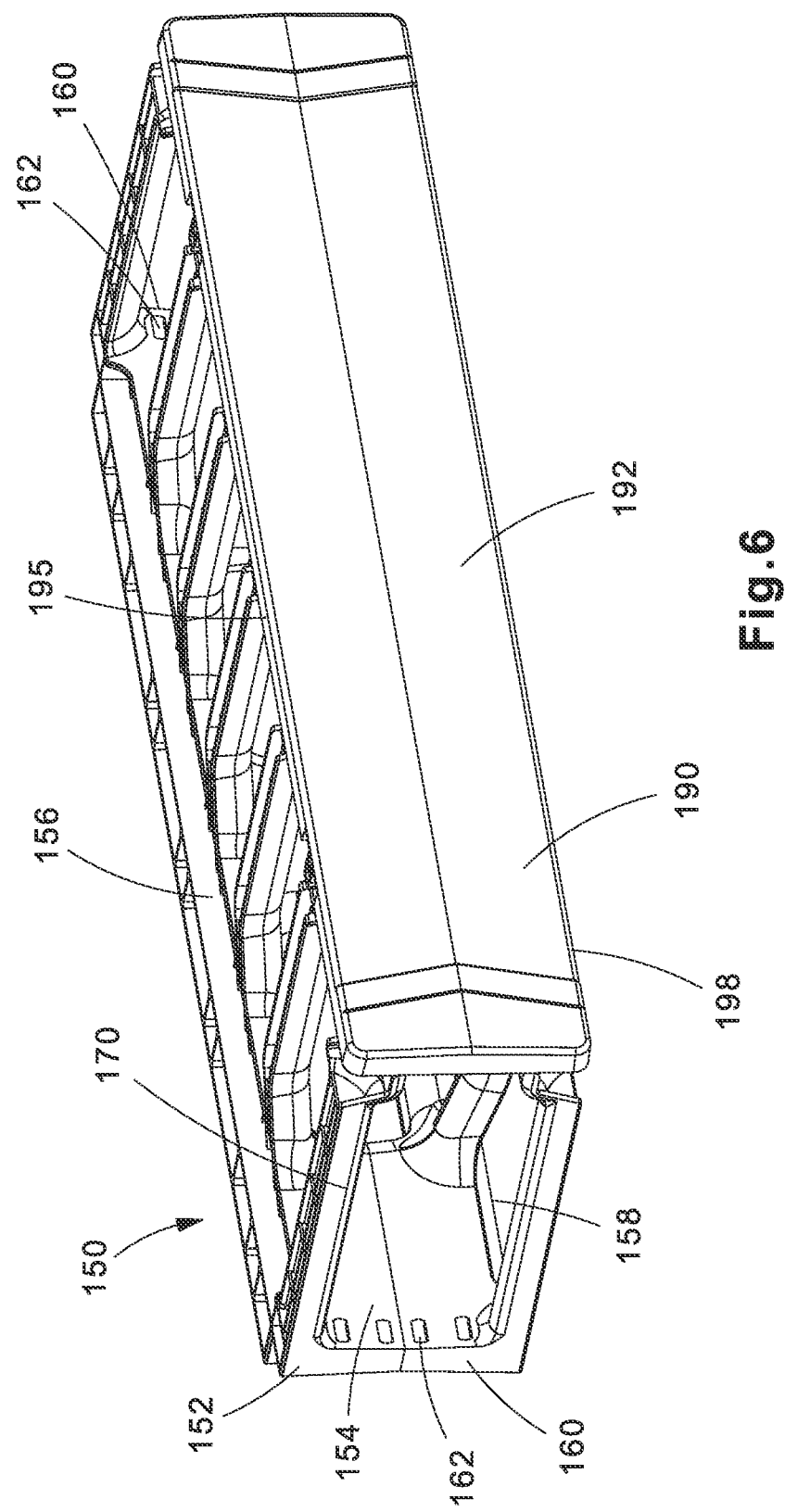
FIG. 6 is a front perspective view of the horizontal cable manager of FIG. 3.

As illustrated in FIGS. 5 and 6, the horizontal cable manager 150 includes a body 152 and a door 190. The body 152 includes a back 154 with a plurality of fingers 170 extending therefrom. The length of the fingers 170 has been extended compared to the fingers of the prior art horizontal cable manager 80. The fingers 170 are arranged in an upper row extending from the upper portion 156 of the back 154 and a lower row extending from the lower portion 158 of the back 154. The upper and lower rows of the fingers 170 are parallel to each other and create a pathway for routing cables therein. The fingers 170 are angled toward the vertical center of the body 152 to provide a technician access to any equipment 60 installed above or below the horizontal cable manager 150.

Each end 160 of the back 154 includes a plurality of holes 162 for receiving fasteners 70 to secure the body 152 of the horizontal cable manager 150 to the network rack 50.

Figure 7:
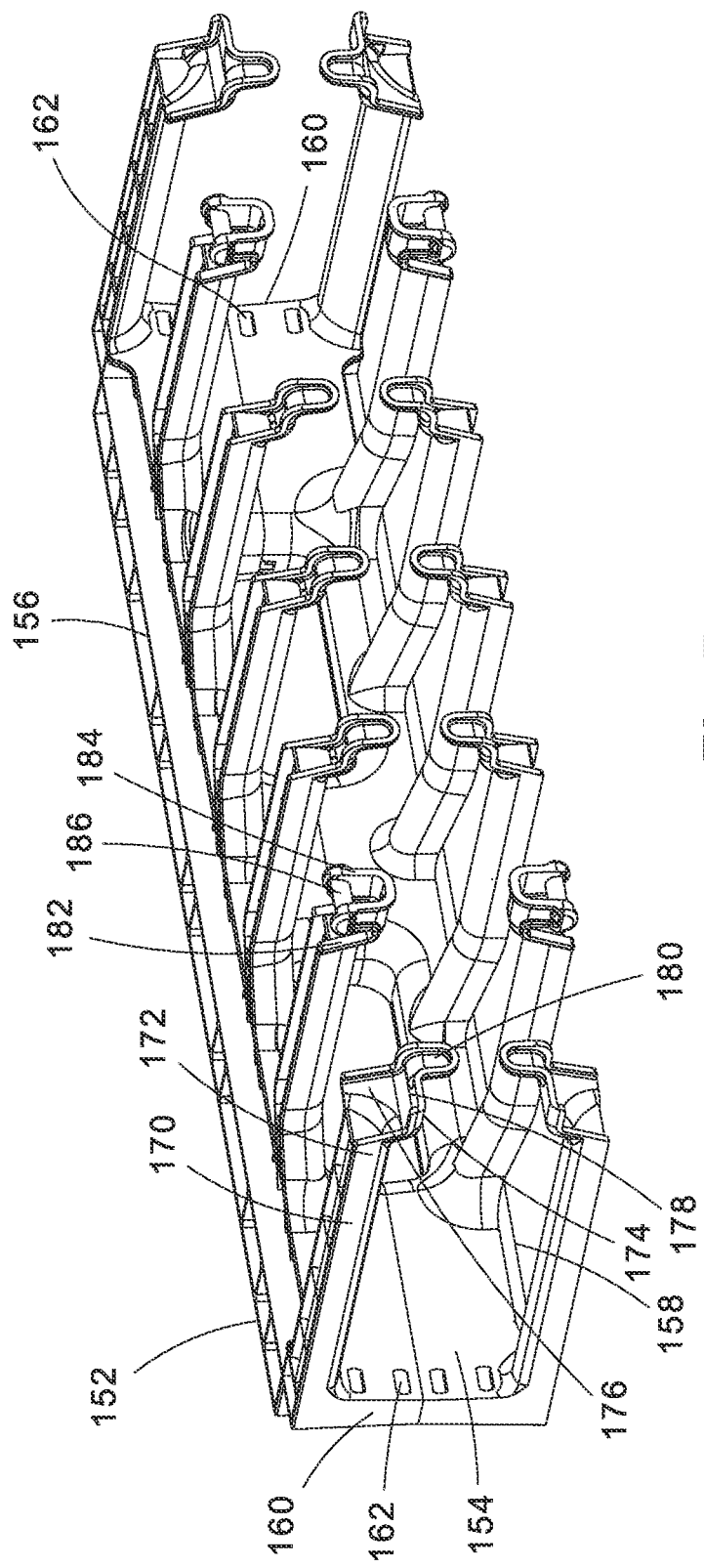
FIG. 7 is a front perspective view of the horizontal cable manager of FIG. 6 with the hinge door removed.
Figure 8:
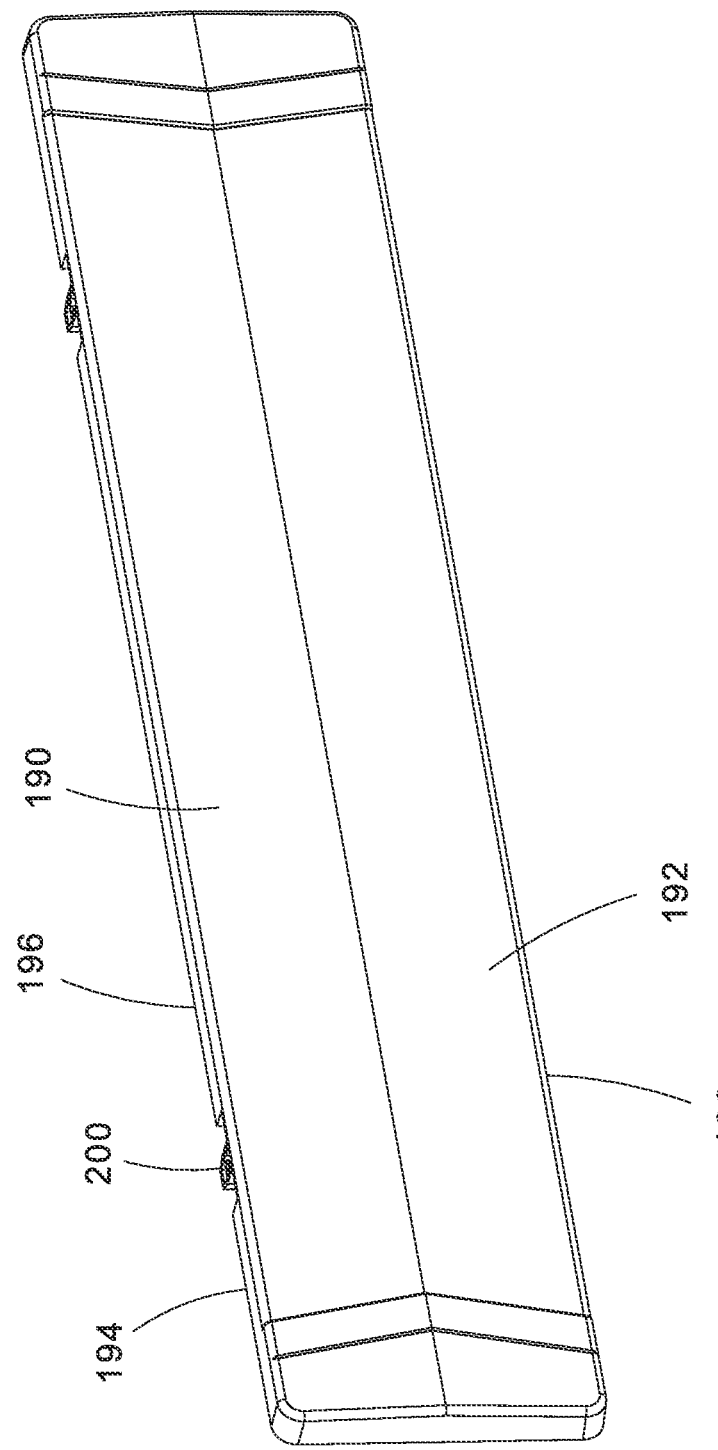
FIG. 8 is a front perspective view of the horizontal cable manager hinge door of FIG. 6.
Figure 9:
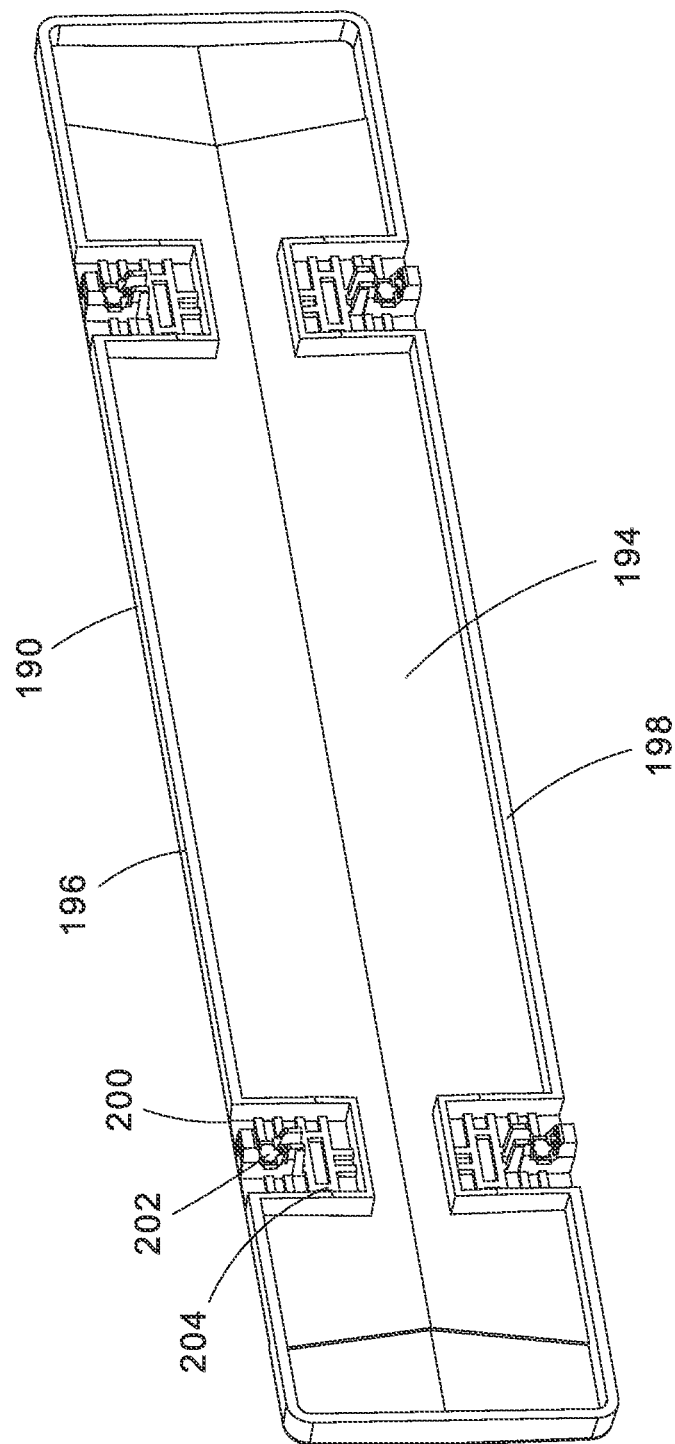
FIG. 9 is a rear perspective view of the horizontal cable manager hinge door of FIG. 8.
Figure 10:
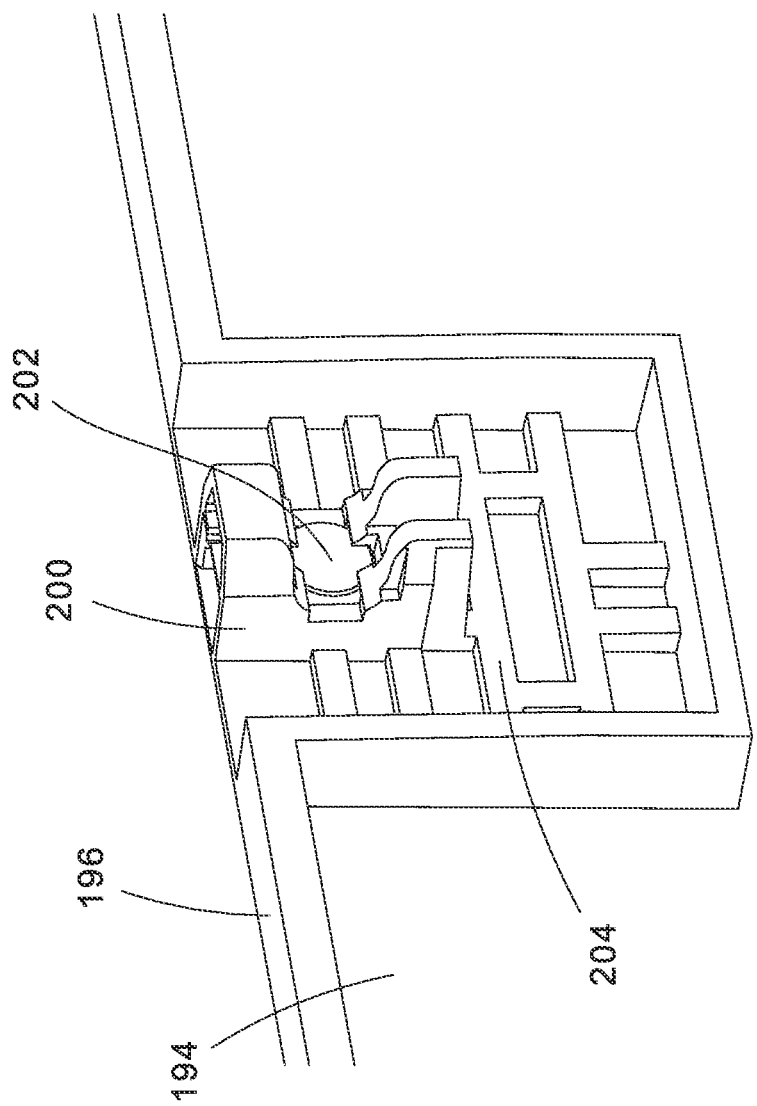
FIG. 10 is a perspective view of the hinge receptacle of the horizontal cable manager hinge door of FIG. 9.
Figure 11:
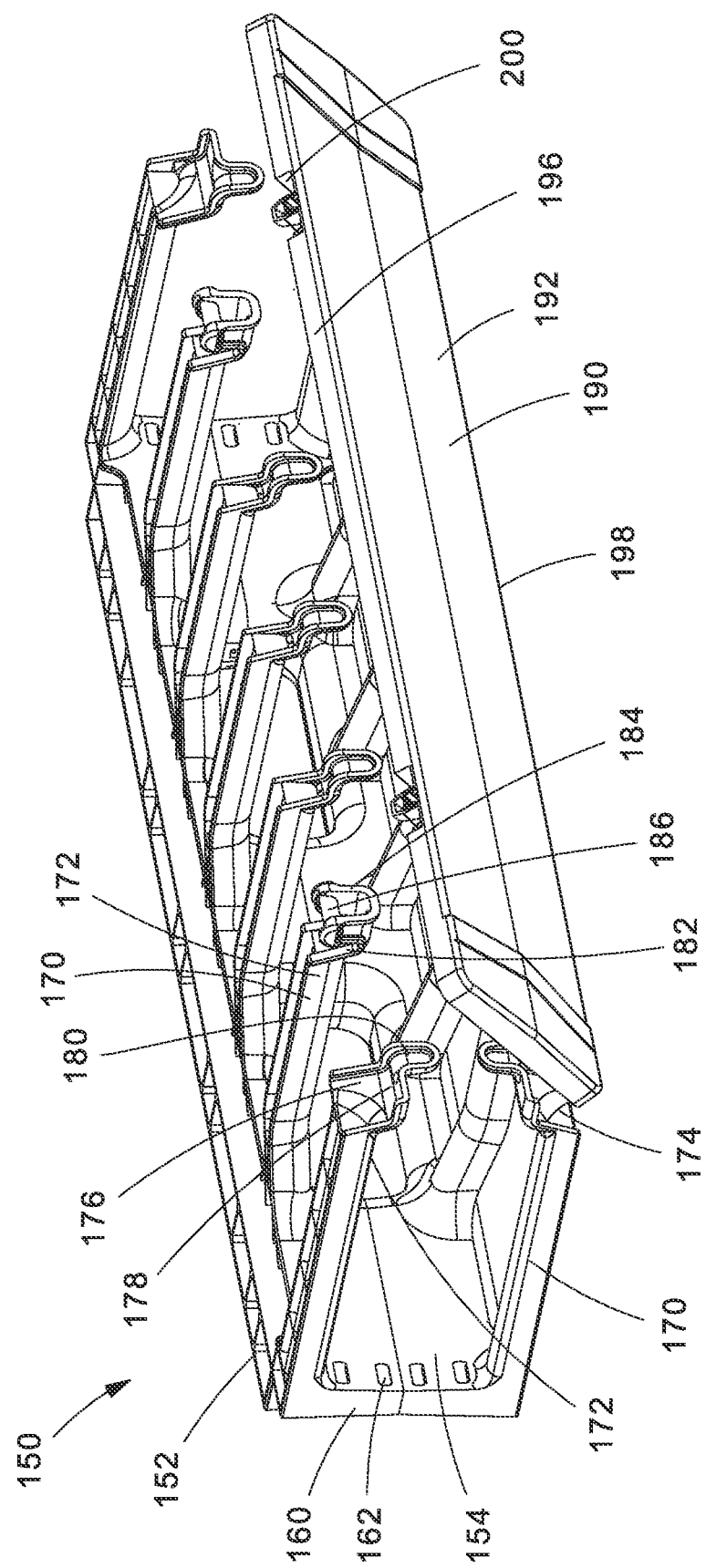
FIG. 11 is a perspective view of the horizontal cable manager of FIG. 6 with the hinge door partially rotated.

The distal end 172 of each finger 170 has either a cable management flag 174 or a hinge pin holder 182. Each cable management flag 174 includes a first member 176, a second member 178, and a third member 180. Each member of the cable management flags can differ in size, length, and shape depending on the location of the finger and the height of the horizontal cable manager. For example, as illustrated in FIG. 7, the cable management flags 174 located near the ends 160 of the body 152 are wider than the cable management flags 174 located near the center of the body 152. The cable management flags 174 extending from aligned fingers 170 in the upper and lower rows are identical.

As illustrated in FIG. 7, the distal end 172 of the aligned fingers 170 in the upper and lower rows include two sets of hinge pin holders 182. However, if desired, the distal end 172 of the fingers 170 could have additional hinge pin holders. The hinge pin holders 182 are generally U-shaped members 184 designed to hold a ferrous hinge pin 186. As discussed below, the hinge pin holder 182 accepts one of the hinge receptacles 200 extending from the back 194 of the door 190.

FIGS. 8-11 illustrate the door 190 of the horizontal cable manager 150. The front 192 of the door 190 includes design elements similar to the design features found on the Panduit Patchrunner 2 vertical cable manager door. For example, the door 190 includes a pentagon with two right angles and chevron character lines.

The back 194 of the door 190 includes a plurality of hinge receptacles 200. The hinge receptacles 200 are positioned along the top edge 196 and the bottom edge 198 of the door 190. Each hinge receptacle 200 includes a rare earth magnet 202 which allows the door 190 to attach to the ferrous hinge pins 186 held by the hinge pin holders 182 at the distal end 172 of the fingers 170 of the body 152. Each hinge receptacle 200 also includes a plurality of strengthening ribs 204.

The rare earth magnets 202 and the ferrous hinge pin 186 form a magnetic hinging mechanism that allows for an effortless attachment of the door 190 to the cable manager body 152. The magnetic hinging mechanism also allows for the door 190 to easily open with a mild pulling force on either the top or bottom edge 196, 198, respectively, of the door 190.

Figure 12:
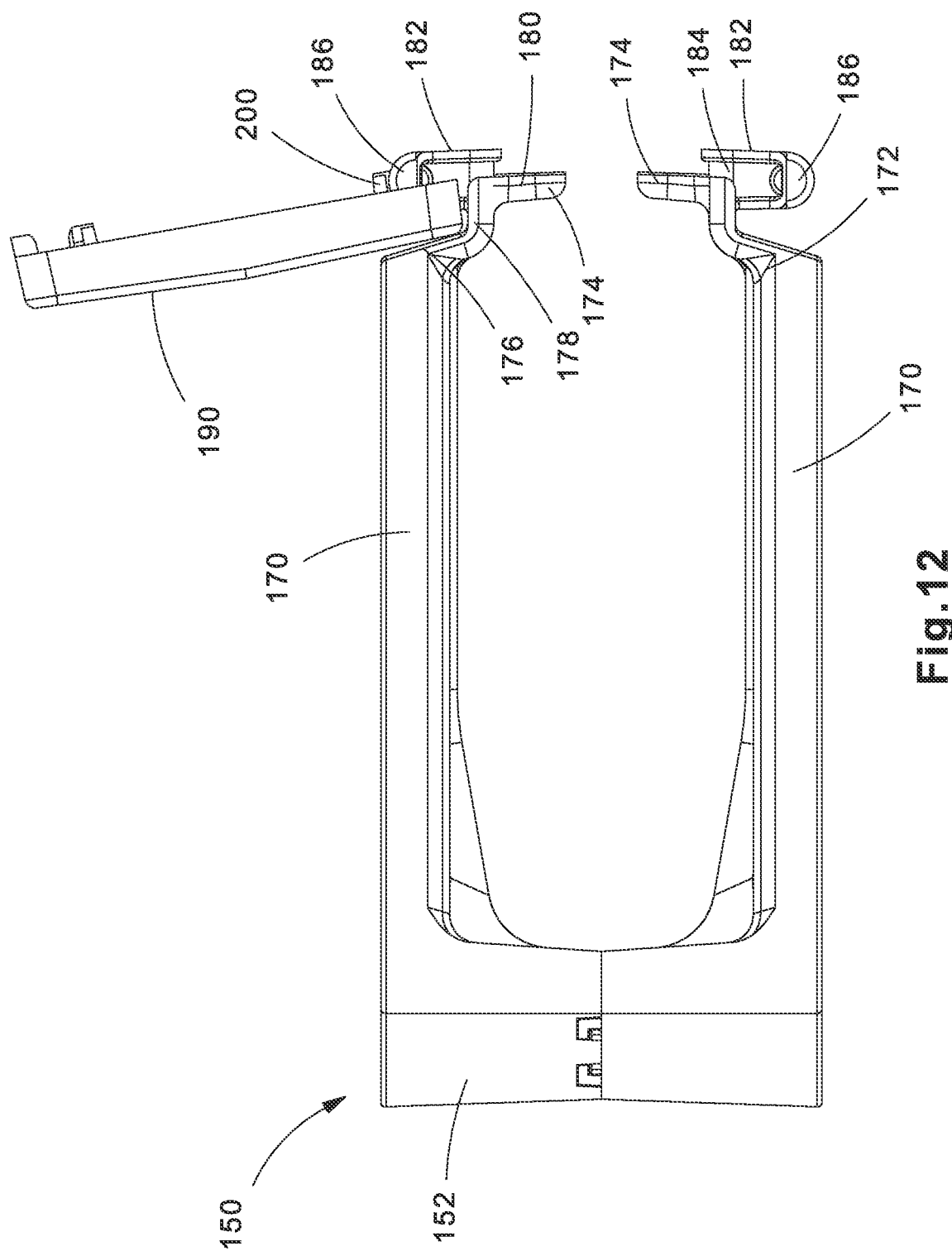
FIG. 12 is a left side view of the horizontal cable manager of FIG. 6 with the hinge door opened and rotated around the upper hinge.
Figure 13:
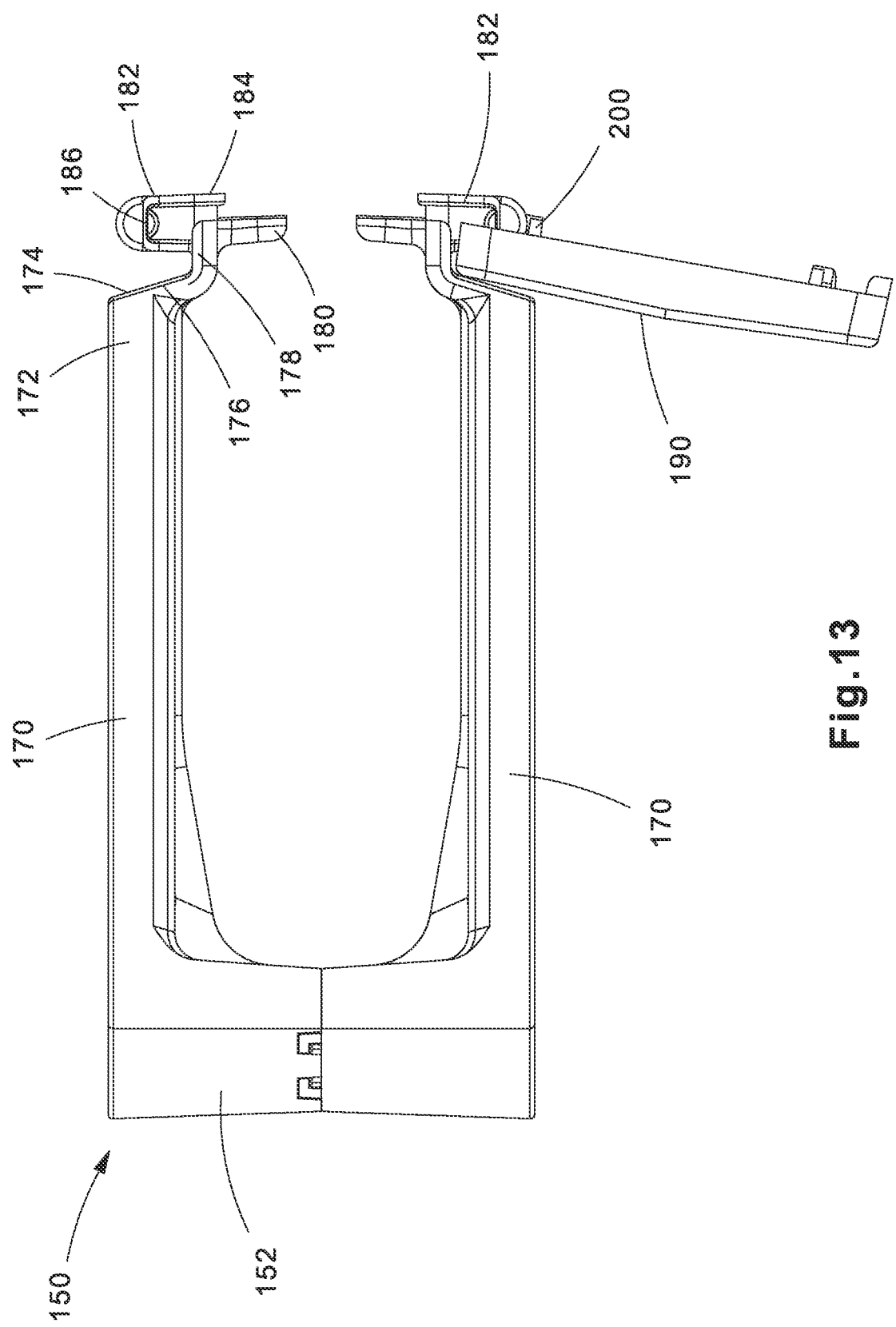
FIG. 13 is a left side view of the horizontal cable manager of FIG. 6 with the hinge door opened and rotated around a lower hinge.

The hinge receptacle 200 and the hinge pin holder 182 are oriented in such a way as to allow the door 190 to be opened and rotated up to 190 degrees around the upper hinge pins 186 (see FIG. 12) or rotated up to 190 degrees around the lower hinge pins 186 (see FIG. 13). When the door 190 is opened upward around the upper hinge pins 186 past 180 degrees, the door 190 will rest in an open position against the first members 176 of the cable management flags 174 to facilitate access to the cables routed inside the cable manager body 152. When the door 190 is opened downward around the lower hinge pins 186, it can be allowed to hang downward at 180 degrees to facilitate access to cables inside the cable manager body 152.

The door 190 can also be completely removed from the cable manager body 152, if desired, by pulling on the door 190 horizontally away from the cable manager body 152.

Figure 14:
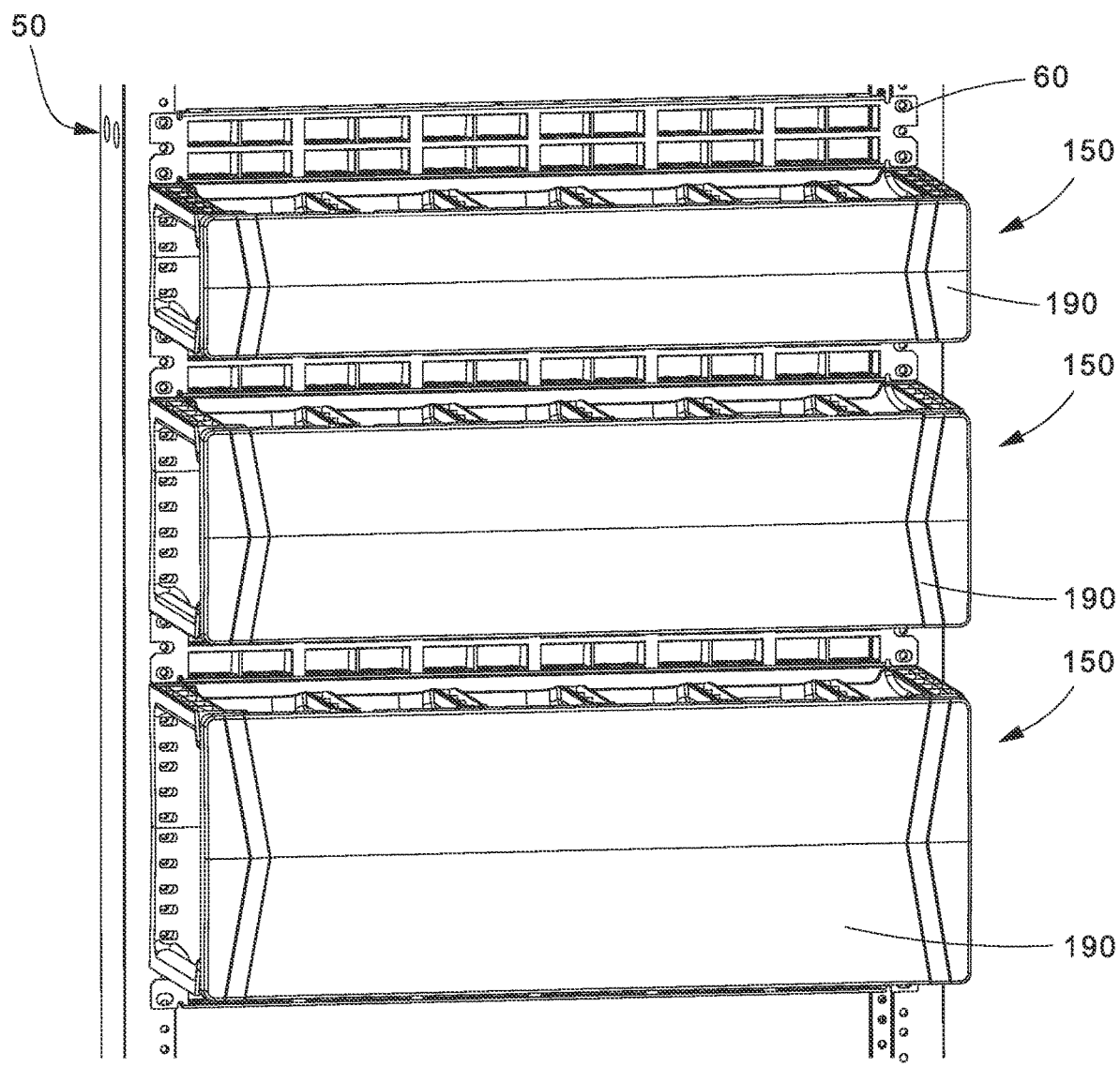
FIG. 14 is a front perspective view of multiple horizontal cable managers having varying heights mounted to a rack.

FIG. 14 illustrates the horizontal cable manager 150 and the hinged door 190 of the present invention having varying heights. For example, the horizontal cable manager 150 can be designed so it is 2 rack units (2 RU), 3 rack units (3 RU), or 4 rack units (4 RU) high. The height of the hinged door 190 is adjusted to accommodate the heights of the various horizontal cable managers 150.

Figure 15:
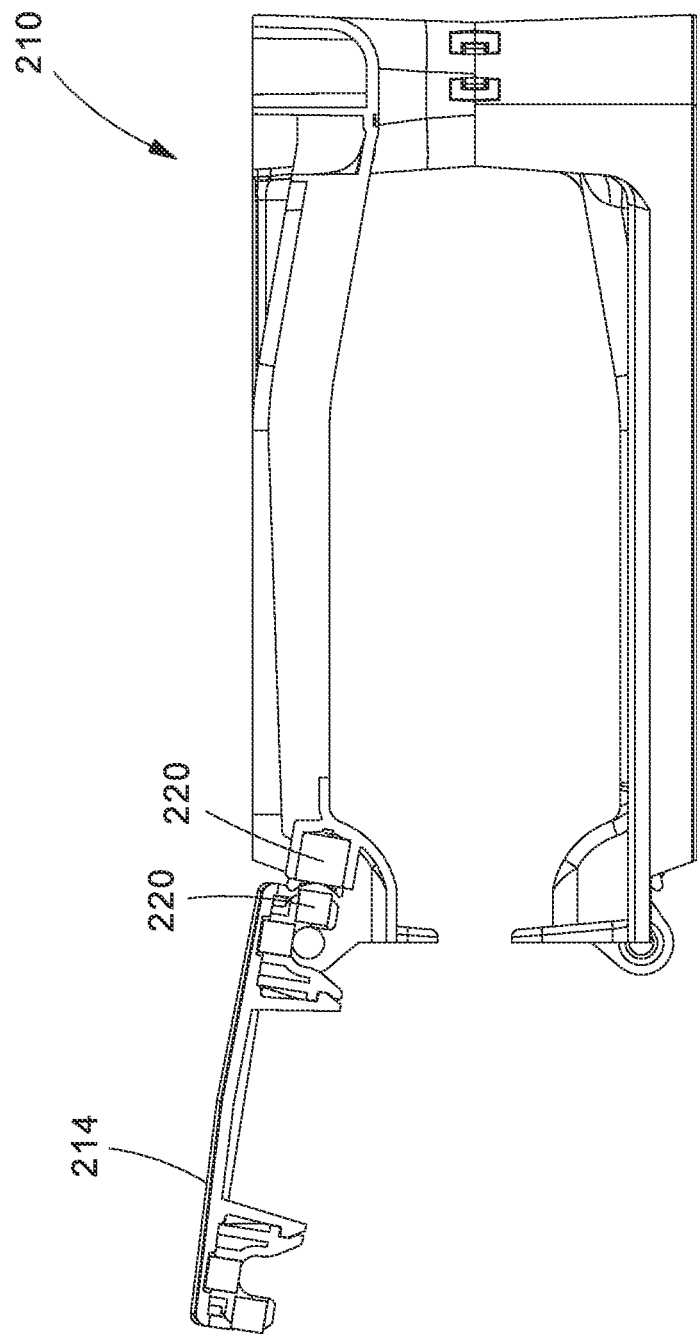
FIG. 15 is side view of an alternative horizontal cable manager of the present invention.

FIG. 15 illustrates an alternative horizontal cable manager 210 embodiment. The horizontal cable manager 210 includes additional magnets 220 at each hinge location. The additional magnets 220 hold the door 214 in an open position by toggling the door 214 into a hold open detent position when the door 214 reaches the fully open position of about 110 degrees from closed. The hold open detent is easily defeated by applying a force to close the door 214.

FIGS. 16 and 17 illustrate another alternative embodiment of a horizontal cable manager 310. The magnets 320 are installed in the door 314 and the cable manager body 312 in such a way that the axis of the magnetic force forms the hinge axis for the door 314. The door 314 is opened by defeating the shear magnetic attraction on the opening side and rotating the door 314 along the hinge axis formed by either the upper magnets 320 or the lower magnets 320.

The door could also include a number of stiffening ribs as dictated by the door size, the necessary flexibility, and molding warp.

Furthermore, while the preferred embodiments of the present invention have been shown and described, it will be obvious to those skilled in the art that changes, and modifications may be made without departing from the teaching of the invention. The matter set forth in the foregoing description and accompanying drawings is offered by way of illustration only and not as limitation.

The invention claimed is:

1. A horizontal cable manager for routing cables in a network rack, the horizontal cable manager comprising:
   a body with a back and a plurality of fingers extending from the back of the body, wherein a distal end of at least one of the plurality of fingers has a hinge pin holder; and
   a door hingedly attached to the plurality of fingers extending from the body, the door having a front, a back, a top edge, a bottom edge, and at least one hinge pin receptacle positioned along at least one of the top edge or the bottom edge of the door, the hinge pin receptacle houses a magnet for enabling the door to attach to the hinge pin holder of the at least one of the plurality of fingers to hold the door in a closed position.

2. The horizontal cable manager of claim 1, wherein the hinge pin holder is a U-shaped member and the U-shaped member holds a hinge pin.

3. The horizontal cable manager of claim 2, wherein the magnet and the hinge pin form a magnetic hinging mechanism for enabling the door to attach to the body, whereby the magnetic hinging mechanism allows for the door to be opened when engaged from the top edge or bottom edge of the door.

4. The horizontal cable manager of claim 2, wherein the hinge pin receptacle and the hinge pin holder allow the door to be opened and rotated up to 190 degrees around the hinge pin.

5. The horizontal cable manager of claim 1, wherein the plurality of fingers are arranged in an upper row extending from an upper portion of the back and a lower row extending from a lower portion of the back, the upper row of fingers and the lower row of fingers are parallel to each other to create a pathway for routing the cables therein.

6. The horizontal cable manager of claim 5, wherein distal ends of aligned fingers in the upper row and the lower row include two sets of hinge pin holders, the hinge pin holders in the upper row hold upper hinge pins and the hinge pin holders in the lower row hold lower hinge pins.

7. The horizontal cable manager of claim 6, wherein when the door is rotated around the upper hinge pins, the door rests in an open position against a first member of a cable management flag at a distal end of at least one of the plurality of fingers for facilitating access to the cables routed inside the horizontal cable manager.

8. The horizontal cable manager of claim 6, wherein when the door is rotated around the lower hinge pins, the door hangs downward at 180 degrees for facilitating access to the cables routed inside the horizontal cable manager.

9. The horizontal cable manager of claim 1, wherein the plurality of fingers are angled towards a vertical center of the body for providing access to equipment installed near the horizontal cable manager.

10. The horizontal cable manager of claim 1, wherein the distal end of at least one of the plurality of fingers has a cable management flag, the cable management flag includes a first member, a second member and a third member.

11. The horizontal cable manager of claim 10, wherein the first member extends at an angle with respect to the finger, the second member extends horizontally from the first member, and the third member extends vertically from the second member.

12. The horizontal cable manager of claim 11, wherein the first member and the second member form a seat for the door when the door is rotated to an open position.

13. The horizontal cable manager of claim 10, wherein the cable management flange at the distal end of the at least one of the plurality of fingers located near an end of the body are wider than cable management flag at the distal end of the at least one of the plurality of fingers located near a center of the body.

14. The horizontal cable manager of claim 13, wherein the cable management flags extending from the distal end of aligned fingers in an upper row and a lower row are identical.

15. The horizontal cable manager of claim 1, wherein the back of the body has a first end and a second end, the first and second ends have a plurality of holes for receiving fasteners to secure the horizontal cable manager to a network rack.

16. The horizontal cable manager of claim 1, wherein the hinge pin receptacle on the back of the door further comprising a plurality of strengthening ribs.

17. A horizontal cable manager for routing cables in a network rack, the horizontal cable manager comprising:
 a body with a back and a plurality of fingers extending from the back of the body, wherein distal ends of the plurality of fingers have one of cable management flags and hinge pin holders;
 a door hingedly attached to the plurality of fingers extending from the body, the door having a front, a back, a top edge, a bottom edge, and hinge pin receptacles positioned along the top edge and the bottom edge of the door,
 wherein the hinge pin holders of the plurality of fingers accept the hinge pin receptacles extending from the back of the door; and
 wherein the hinge pin receptacles further comprising a magnet and the hinge pin holders further comprising a hinge pin, whereby the magnets engage the hinge pins to hold the door in a closed position.

18. The horizontal cable manager of claim 17, wherein the hinge pin holder further comprising magnets for holding the door in an open detent position.

19. The horizontal cable manager of claim 17, wherein the hinge pin receptacles further comprising a first set of magnets and the hinge pin holders further comprising a second set of magnets, whereby the first set of magnets and the second set of magnets form a hinge axis enabling the door to be rotated to an open position.

\* \* \* \* \*